(12) United States Patent
Ogawa

(10) Patent No.: US 11,726,732 B2
(45) Date of Patent: Aug. 15, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Nobuhiro Ogawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/510,171

(22) Filed: Oct. 25, 2021

(65) Prior Publication Data

US 2022/0137906 A1 May 5, 2022

(30) Foreign Application Priority Data

Oct. 29, 2020 (JP) ................................ 2020-181048

(51) Int. Cl.
*G06F 3/12* (2006.01)
*G06K 15/02* (2006.01)

(52) U.S. Cl.
CPC .......... *G06F 3/1273* (2013.01); *G06F 3/1205* (2013.01); *G06K 15/1805* (2013.01); *G06K 15/1806* (2013.01)

(58) Field of Classification Search
CPC combination set(s) only.
See application file for complete search history.

(56) References Cited

U.S. PATENT DOCUMENTS

| | | | |
|---|---|---|---|
| 2009/0231609 A1* | 9/2009 | Chipchase | G06F 3/1273 358/1.15 |
| 2012/0327463 A1* | 12/2012 | Mizuno | G06F 3/1288 358/1.15 |
| 2013/0335778 A1* | 12/2013 | Sugiyama | G06F 3/1274 358/1.16 |
| 2014/0211256 A1* | 7/2014 | Hosotsubo | H04N 1/00042 358/1.15 |
| 2015/0146234 A1* | 5/2015 | Konuma | G06K 15/402 358/1.14 |
| 2015/0371126 A1* | 12/2015 | Ota | G06K 15/408 358/1.14 |
| 2019/0220237 A1* | 7/2019 | Maeda | G06F 3/1273 |

FOREIGN PATENT DOCUMENTS

JP 2015101016 A 6/2015

* cited by examiner

*Primary Examiner* — Helen Zong
(74) *Attorney, Agent, or Firm* — Canon U.S.A., Inc. IP Division

(57) ABSTRACT

An information processing apparatus capable of communicating with an image output apparatus stores print setting information corresponding to a print job for which print is commanded, as history information in a storage unit thereof, and displays, in a case where print using the history information is commanded, information regarding an image output apparatus that is available for use by the information processing apparatus does not correspond to part of setting values included in the history information, and a print result of print processing to be executed by the image output apparatus using the history information satisfies a predetermined condition, a print setting screen in which the information regarding the image output apparatus is reflected in an item corresponding to the part of the setting values and setting values of the history information are reflected in other items.

15 Claims, 13 Drawing Sheets

FIG.5

| HISTORY ITEMS | HISTORY INFORMATION A | HISTORY INFORMATION B | HISTORY INFORMATION C |
|---|---|---|---|
| IMAGE OUTPUT APPARATUS | PRINTER 1 | PRINTER 1 | PRINTER 2 |
| PAPER FEEDING PORT | ROLL 1 | ROLL 2 | ROLL 1 |
| PAPER TYPE | PHOTO PAPER A | PHOTO PAPER A | PHOTO PAPER B |
| PAPER SIZE | 36 INCHES | 24 INCHES | 36 INCHES |
| PAPER DISCHARGE DESTINATION | REAR STACKER | REAR STACKER | BASKET |
| COLOR MODE | COLOR | COLOR | MONOCHROME |
| IMAGE QUALITY PRIORITY | PAINTING | PAINTING | POSTER |
| PRINT QUALITY | CLEAR | STANDARD | STANDARD |
| ROTATION/ PRINT POSITION | NO ROTATION/ CENTER ALIGNMENT | ROTATED BY 90°/ LEFT ALIGNMENT | NO ROTATION/ LEFT ALIGNMENT |
| BORDERLESS PRINT | INVALID | INVALID | VALID |

FIG.7

| PREVIEW | FILE NAME | CANCEL | OUTPUT PRINTER | OUTPUT SIZE | TOTAL NUMBER OF PAGES | PRINT EXECUTION DATE AND TIME |
|---|---|---|---|---|---|---|
| | PrintData_2.pdf | | PRINTER 1 | 36 INCHES | 6 PAGES | 2020/6/24 13:10:20 |
| | PrintData_2.pdf | | PRINTER 1 | 24 INCHES | 12 PAGES | 2020/5/14 15:20:40 |
| | PrintData_2.pdf | | PRINTER 2 | 36 INCHES | 8 PAGES | 2020/4/5 20:12:10 |
| | PrintData_2.pdf | | PRINTER 2 | 36 INCHES | 3 PAGES | 2020/3/14 13:10:10 |

MAXIMUM NUMBER OF ITEMS TO BE STORED: 4 (UP TO 500)

JOB HISTORY

FILE TOOL HELP
PREPARATION FOR JOB  PROGRESS OF JOB

RE-SUBMIT  CANCEL

FIG.8A

FILE TOOL HELP

PREPARATION FOR JOB | PROGRESS OF JOB | JOB HISTORY

JOB LIST

1. ArchD 10page.pdf PAGE NUMBER 10   914 × 610 mm
2. 914 × 610 mm
3. 914 × 610 mm
4. 914 × 610 mm
5. 914 × 610 mm
6. 914 × 610 mm
7. 914 × 610 mm
8. 914 × 610 mm
9. 914 × 610 mm
10. 914 × 610 mm

PREVIEW

OUTPUT DATA DRAWING AREA

PAPER SIZE: 1118 mm × 610 mm / WIDTH OF ROLL PAPER: 1118 mm

33%

PRINT SETTINGS

FAVORITES:
NOT APPLIED

PRINTER:
● PRINTER 2

PAPER TO BE FED:
PHOTO PAPER A

[Dialog 801]
PRINTER 1 IN HISTORY INFORMATION A IS NOT AVAILABLE

REAR STACKER IN HISTORY INFORMATION A IS NOT AVAILABLE

[OK]

CENTER ALIGNMENT
☐ BORDERLESS PRINT
☐ NESTING

PRINT

PRINTER STATUS

● PRINTER 1:
CONNECTION DESTINATION: _1
INSTALLATION LOCATION:
UNABLE TO COMMUNICATE WITH PRINTER

◎1 PLAIN PAPER  0.0 m 1117.6 mm
◎2 PLAIN PAPER  0.0 m 1117.6 mm
☐ PLAIN PAPER  1117.6 mm
☐ PLAIN PAPER  1117.6 mm

● PRINTER 2
CONNECTION DESTINATION: 172.23.66.51
INSTALLATION LOCATION:
REMAINING AMOUNT OF INK/TONER: LOW

PHOTO PAPER A
36 INCHES

REMAINING AMOUNT OF INK/TONER
MBK
BK
Y
M
C

PRINT JOB IN STANDBY: 0
NUMBER OF SHEETS ON PAPER DISCHARGE TRAY: 0

INFORMATION PROCESSING APPARATUS, CONTROL METHOD, AND STORAGE MEDIUM

BACKGROUND

Field

The present disclosure relates to an image processing apparatus, a control method, and a storage medium.

Description of the Related Art

To increase user convenience, a configuration is conceivable in which re-print is commanded using history information. Japanese Patent Application Laid-Open No. 2015-101016 discusses a configuration of performing print using stored job information.

Japanese Patent Application Laid-Open No. 2015-101016, however, fails to discuss a case where an image output apparatus cannot perform print using the stored job information.

SUMMARY

Exemplary embodiments are directed to increasing user convenience in performing print using history information. In some embodiments, in a case where an image output apparatus cannot perform print using stored job information, processing is switched with unavailable setting information out of the stored job information.

According to embodiments of the present disclosure, an information processing apparatus capable of communicating with an image output apparatus includes a storage unit, a storage control unit configured to store print setting information corresponding to a print job for which print is commanded, as history information in the storage unit, and a display control unit. The display unit is configured to display, in a case where print using the history information is commanded, information regarding an image output apparatus that is available for use by the information processing apparatus does not correspond to part of setting values included in the history information, and a print result of print processing to be executed by the image output apparatus using the history information satisfies a predetermined condition, a print setting screen in which the information regarding the image output apparatus is reflected in an item corresponding to the part of the setting values and setting values of the history information are reflected in other items, and display, in a case where the print using the history information is commanded, the information regarding the image output apparatus that is available for use by the information processing apparatus does not correspond to the part of the setting values included in the history information, and the print result of the print processing to be executed by the image output apparatus using the history information does not satisfy the predetermined condition, a print setting screen in which the setting values included in the history information are not reflected.

Further features of the present disclosure will become apparent from the following description of exemplary embodiments with reference to the attached drawings.

BRIEF DESCRIPTION OF THE DRAWINGS

FIG. 5 is a diagram illustrating an example of print history information.

FIG. 7 is a diagram illustrating an example of a print history selection screen.

FIGS. 8A to 8C are diagrams each illustrating an example of a display screen for the print setting information.

DESCRIPTION OF THE EMBODIMENTS

Exemplary embodiments of the present disclosure will be described below with reference to the accompanying drawings. The following exemplary embodiments do not limit the present disclosure, and all of combinations of features described in the exemplary embodiments are not necessarily essential to a means for solving the issues of the present disclosure.

A first exemplary embodiment of the present disclosure will be described below. Initially, a print system according to the present exemplary embodiment will be described. The print system according to the present exemplary embodiment includes an information processing apparatus (print personal computer (PC)) that instructs print, and a plurality of image output apparatuses. In the print system illustrated in FIG. 1, a print PC 102 creates a print job and transmits the print job to each image output apparatus.

At the time of creating the print job, a user performs processing of setting print setting information on a screen of the print PC 102 as necessary. To reduce the occurrence of a print error in the image output apparatuses, the print PC 102 acquires status information for each image output apparatus in the processing of setting the print setting information performed by the user. The print PC 102 then checks matching between the print setting information set by the user and the status information acquired from the image output apparatus. Examples of the status information include a name of an image output apparatus 100, information about paper set in a paper feeding unit, a remaining amount of paper, identification information about an ink tank, a remaining amount of ink, and information about an available stacker.

Figure 1:
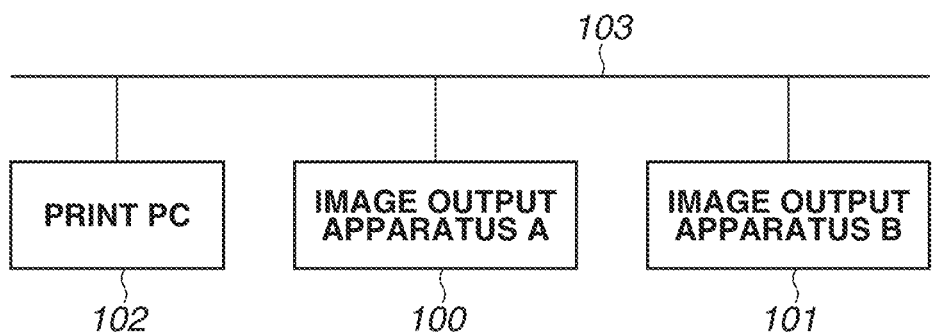
FIG. 1 is a diagram illustrating an example of a print system.

FIG. 1 is a diagram illustrating an example of a system configuration in a network environment of the present system. As illustrated in FIG. 1, the print PC 102 is connectable to image output apparatuses 100 and 101 via a network 103. The print PC 102 creates a print job and transmits the print job to the image output apparatuses 100 and 101. While there are two image output apparatuses, i.e., the image output apparatuses 100 and 101, in the present exemplary embodiment, the number of image output apparatuses is not limited thereto, and may be one, or three or more. While there is one print PC in the present exemplary embodiment, there may be two or more print PCs. For example, in a case where paper set by the user is changed or device information is changed, each of the image output apparatuses 100 and 101 stores changed status information.

In the present exemplary embodiment, a print job is transmitted from an application for use in printing (hereinafter, referred to as print application) installed in the print PC 102 to an image output apparatuses via a printer driver. For example, the print application and the printer driver are installed in the print PC 102. The print application acquires print parameters, such as a paper type, a paper size, and print quality for the image output apparatus 100 corresponding to the printer driver, and displays a display screen 600 for setting the print setting information. The user operates the display screen 600 to submit a print document, such as a Portable Document Format (PDF) file and a Tagged Image File Format (TIFF) file, to the print application. A list of, for example, a file name and page number of the submitted print document is displayed on a file list display section 601. For example, a preview image obtained by performing rendering on the submitted print document on a page-by-page basis is displayed on a preview display section 602. The display screen 600 may also be referred to as a print setting screen for accepting the print setting information.

Subsequently, the user sets the print setting information using a print setting display section 603, and presses a print button 604. In a case where this operation is performed, the print PC 102 transmits a print job to the image output apparatus that is selected in the print setting display section 603, via the printer driver corresponding to the selected image output apparatus. In a case where the print job has been transmitted, the print application executes storage control processing of storing history information about the print job in a print history information database (DB) 400. Information stored as the history information is the print setting information set in the print setting display section 603 and path information indicating a location where the print document used for creating the print job is stored. The print setting information set in the print setting display section 603 and the print document may be stored as the history information.

Consideration is now given to a case where the user commands re-print using the stored history information. For example, in a case of placing an emphasis on reproducibility of shades of colors of a painting, a poster, a photograph, or the like, it is highly likely that the user permits execution of print based on the premise that the image output apparatus 100 and pieces of print setting information indicated in the history items 501 are completely matched. Such print is referred to as reproduction print in the present exemplary embodiment. For example, in a case where print using an image output apparatus indicated by the history information cannot be performed due to disposal or replacement of the image output apparatus, there is a possibility that the user does not permit reproduction print using the history information. Moreover, in a case where information indicated by the history information does not match the status information about the current image output apparatus because of change in paper type, ink color configuration, or the like in the image output apparatus indicated by the history information, there is a possibility that the user does not permit reproduction print using the history information.

Meanwhile, consideration is now given to a case of additional print with no preference for shades of colors for an output product, such as a computer-aided design (CAD) drawing, a line drawing, and an instruction manual. In such a case, if a difference in information to be printed or a difference in texture, such as discontinuity of an image (missing image data) and a difference in category of a paper type, is not so large, it is highly likely that the user permits execution of print even if the information indicated in the history items 501 is not entirely matched. Such print is referred to as additional print in the present exemplary embodiment.

In the present exemplary embodiment, in a case where re-print is commanded using the history information, the print application notifies the user of unavailable print setting information out of the history information. Furthermore, the print application switches between reflecting of the print setting information included in the history information on the display screen 600 and not reflecting thereof depending on a restorable level of the history information.

Figure 8B:
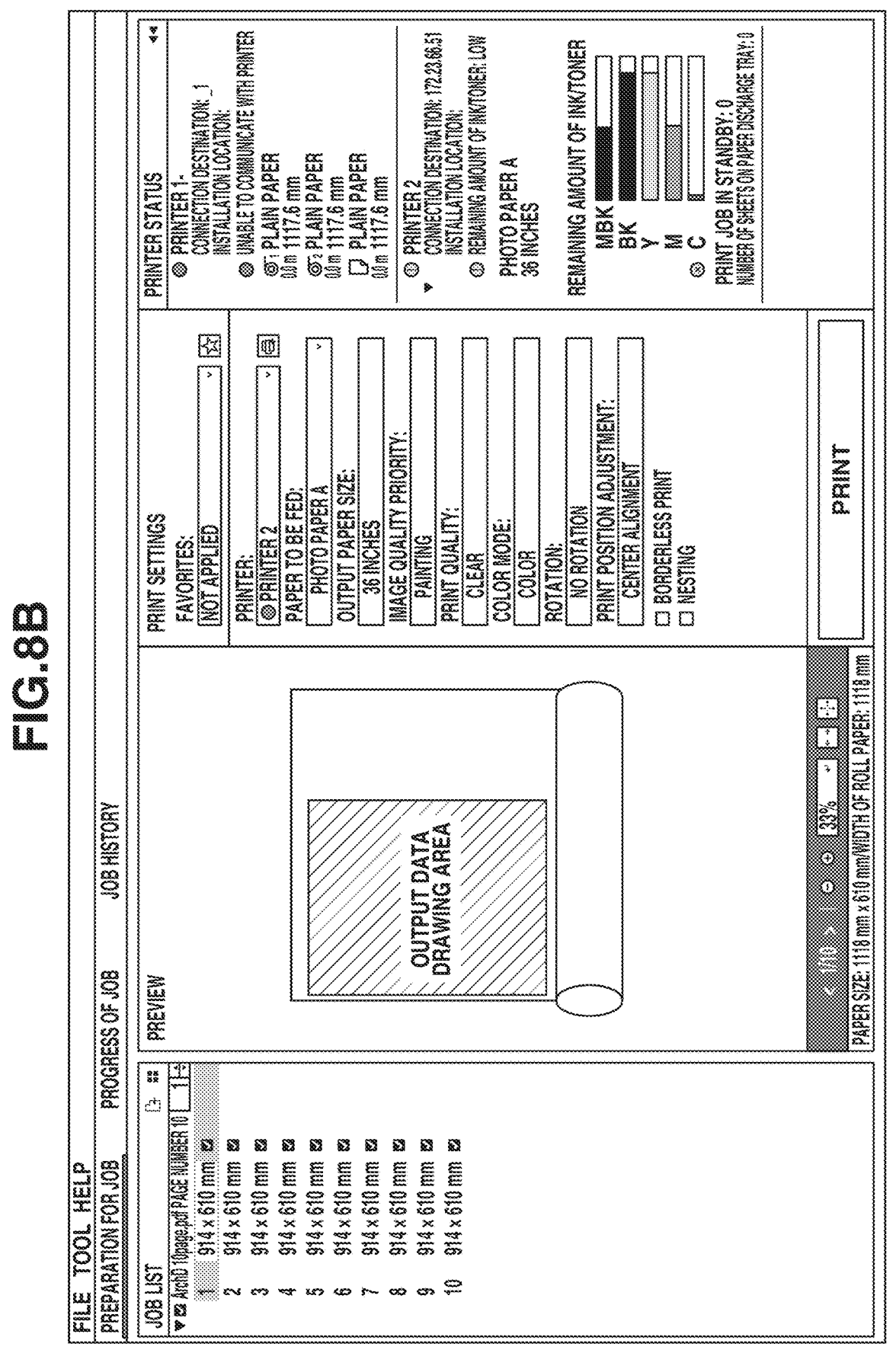
Figure 8C:
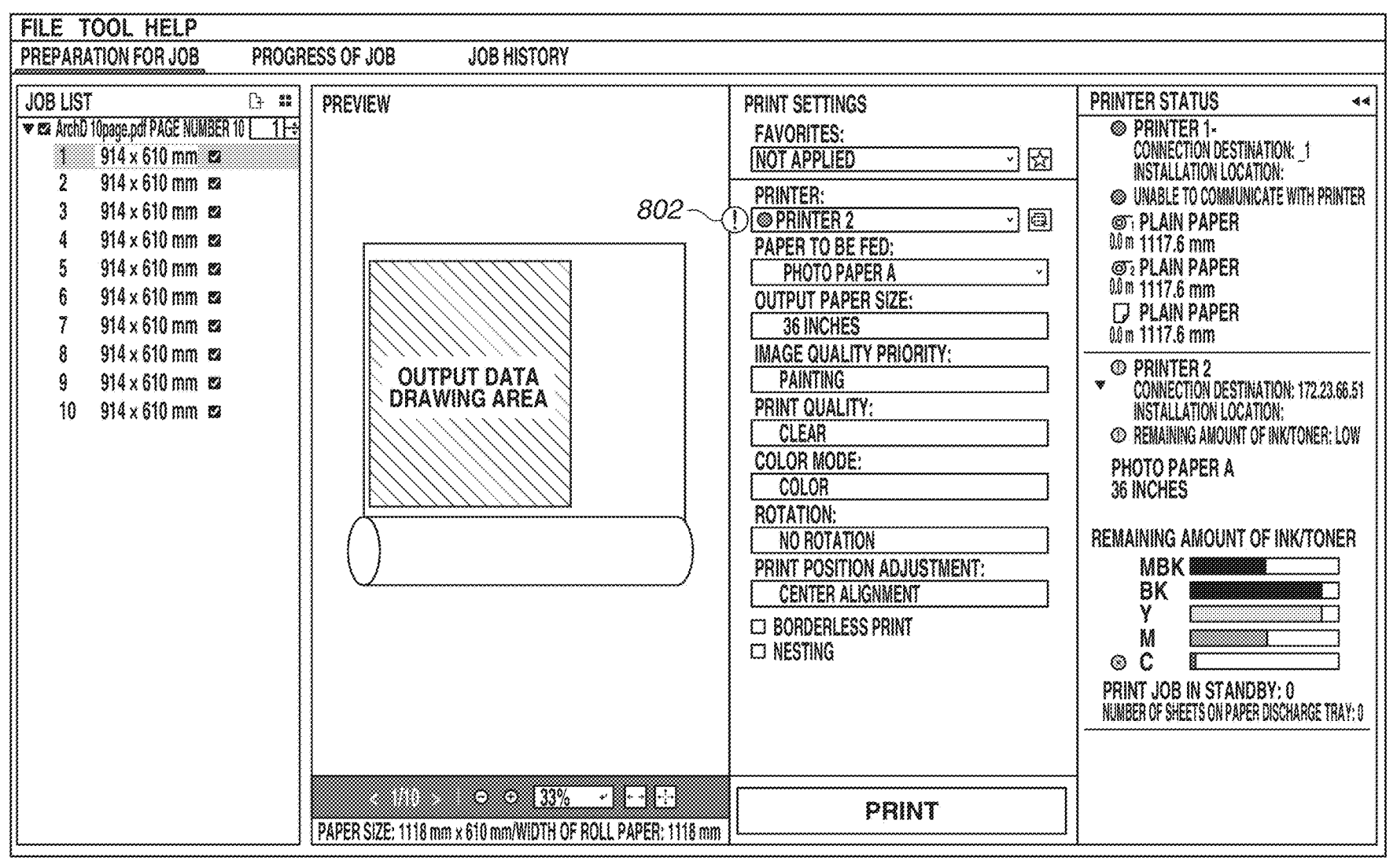

At the time of execution of re-print, the print application can display a preview image as illustrated in FIGS. 8A to 8C by reading a print document based on a path of the print document included in the history information.

Figure 2:
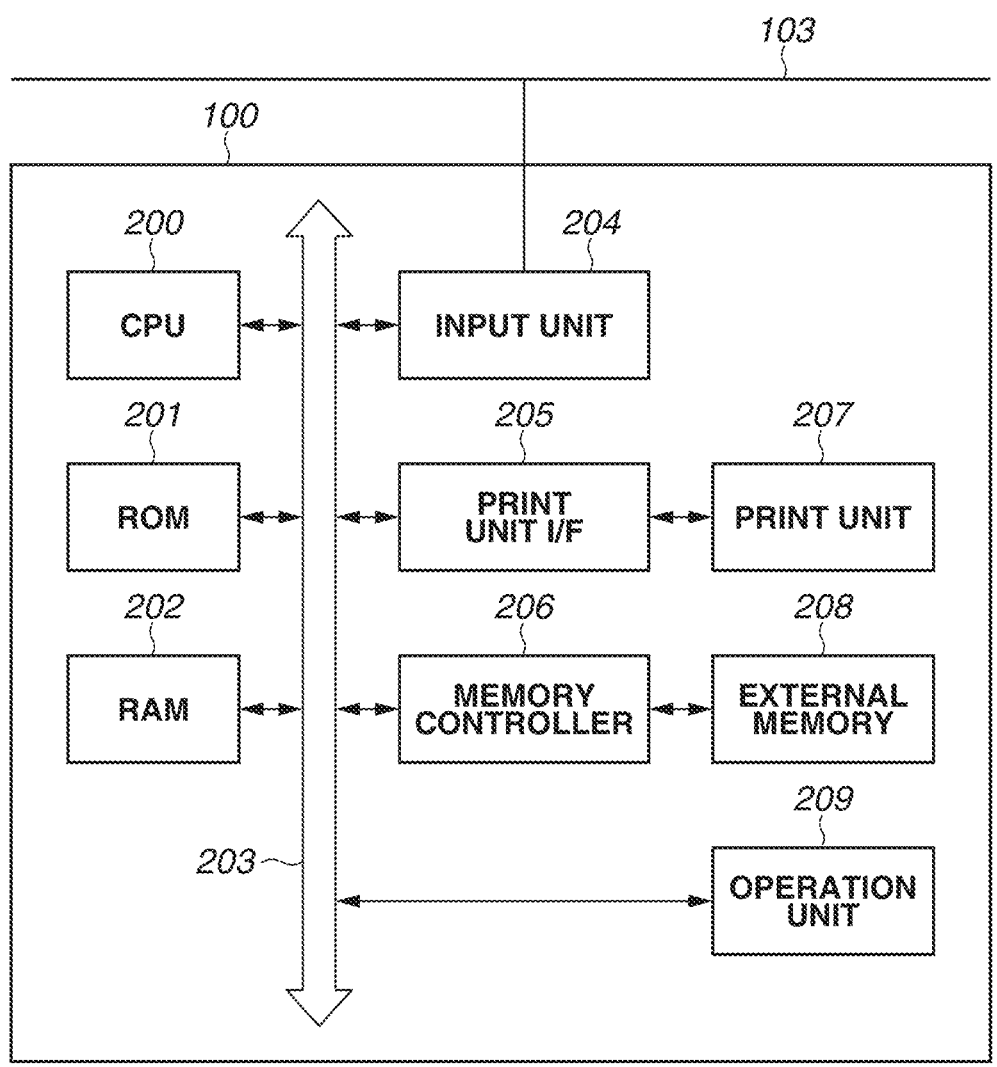
FIG. 2 is a diagram illustrating an example of a hardware configuration of an image output apparatus.

FIG. 2 is a diagram illustrating an example of a hardware configuration of the image output apparatus 100. Since the image output apparatus 101 has a similar configuration, a description thereof is omitted. The image output apparatus 100 is controlled by a central processing unit (CPU) 200. The CPU 200 operates based on a control program or the like stored in a read-only memory (ROM) for a program in a ROM 201, or a control program or the like stored in an external memory 208. The CPU 200 outputs an image signal based on a print job to a print unit (printer engine) 207 connected to a print unit interface (I/F) 205 via a system bus 203. The CPU 200 is capable of performing processing of communicating with the print PC 102 via an input unit 204, and can notify the print PC 102 of information in the image output apparatus 100. The CPU 200 is capable of receiving the print job output to the print unit 207 via the input unit 204. A random-access memory (RAM) 202 functions as a main memory of the CPU 200, a work area, and the like, and is configured so that a memory capacity can be extended by an optional RAM connected to an expansion port, which is not illustrated. The RAM 202 is used for an output information development area, an environment data storage area, a non-volatile memory, and the like. A memory controller 206 performs access control of the external memory 208, which is a hard disk drive (HDD), an integrated circuit (IC) card, or the like. The external memory 208 can be optionally connected, and stores therein font data, an emulation program, form data, information regarding paper registered in the image output apparatus (such as a paper size and a paper type), and the like. An operation unit 209 is provided with a panel, displays various types of information, and accepts the user's operation.

Figure 3:
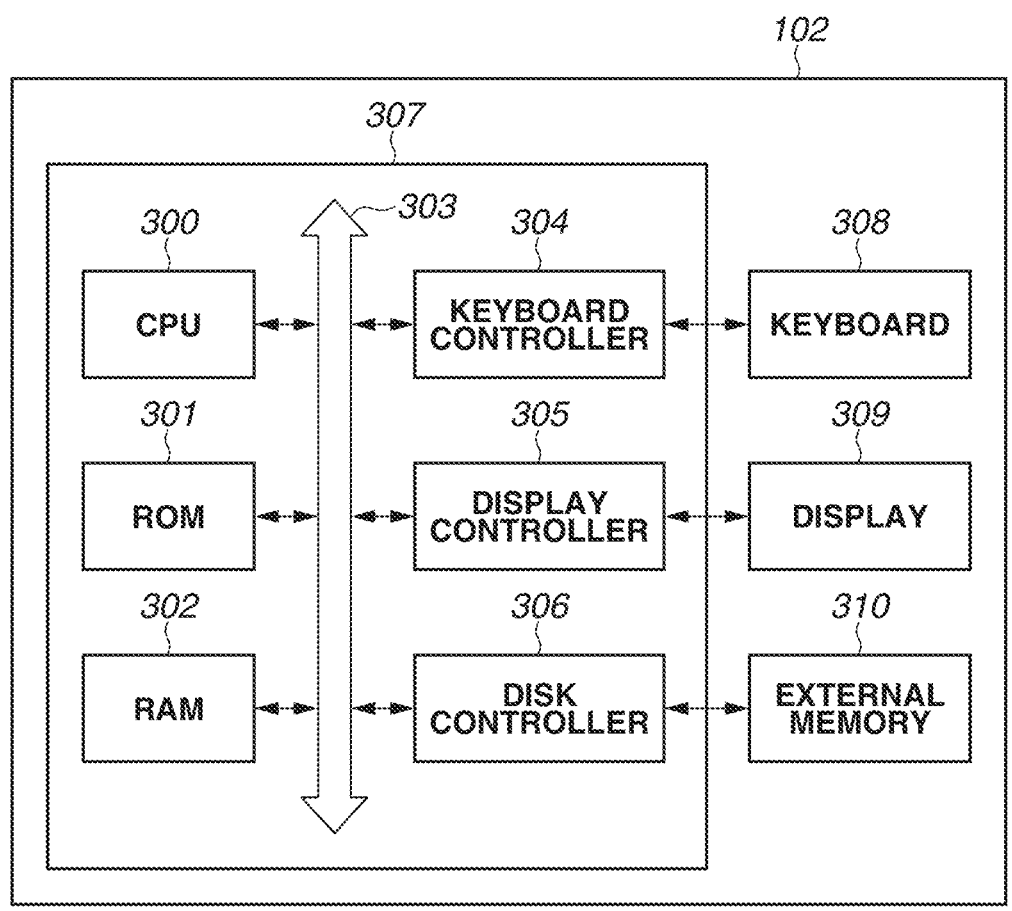
FIG. 3 is a diagram illustrating an example of a hardware configuration of a print personal computer (PC).

FIG. 3 is a block diagram illustrating a computer configuration of the print PC 102 in FIG. 1. A computer interior 307 includes a CPU 300, a ROM 301, a RAM 302, a keyboard controller 304, a display controller 305, and a disk controller 306. The CPU 300 loads various types of programs, such as a control program, a system program, and an application program, from an external memory 310 to the RAM 302 via the disk controller 306. The CPU 300 executes a program of various types loaded to the RAM 302 to perform various types of data processing or display control of a display 309. The CPU 300 may read out a control program or the like from the ROM 301. The CPU 300 may be a dedicated circuit, such as an application-specific integrated circuit (ASIC). The CPU 300 and the dedicated circuit are merely examples of a hardware circuit and a hardware processor.

The disk controller 306 controls access to the external memory 310, such as a hard disk (HD), a compact diskread-only memory (CD-ROM), a digital versatile disk-read-only memory (DVD-ROM), and a universal serial bus (USB). The RAM 302 is configured so that its capacity can be expanded by an optional RAM or the like, which is not illustrated, and is utilized mainly as a work area of the CPU 300. The keyboard controller 304 controls a key input from a keyboard 308 or a pointing device, which is not illustrated. The display controller 305 controls display performed by the display 309. In the present exemplary embodiment, unless specified otherwise, the CPU 300 controls each unit connected to a main bus 303 via the main bus 303.

Figure 4:
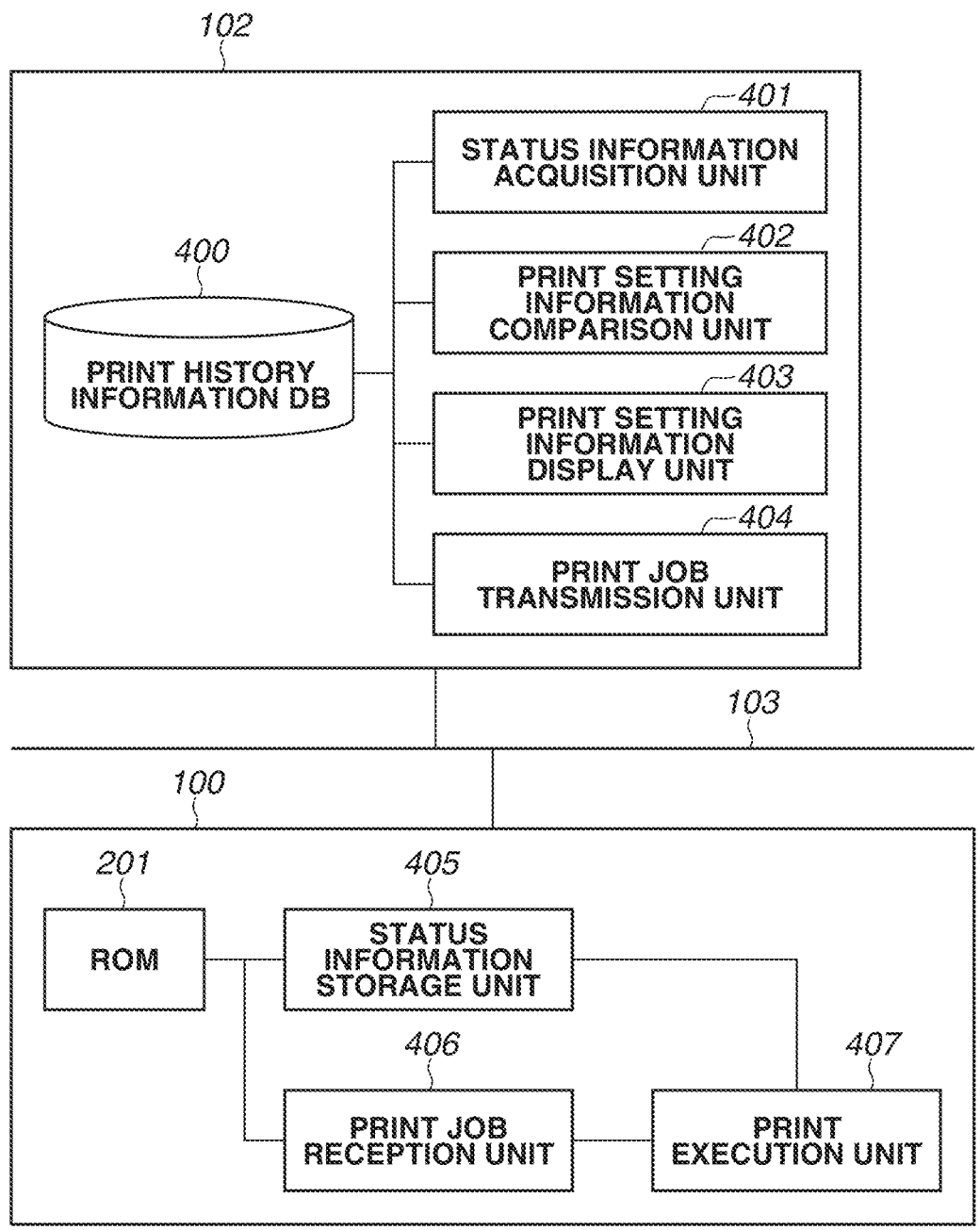
FIG. 4 is a diagram illustrating an example of a functional block of the print system.

FIG. 4 is a diagram illustrating an example of a functional block of the present system regarding the image output apparatuses 100 and 101, and the print PC 102, which have been described in conjunction with FIGS. 1 to 3. Initially, a functional block in the image output apparatus 100 will be described. The ROM 201 includes a status information storage unit 405, a print job reception unit 406, and a print execution unit 407. The status information storage unit 405 holds status information.

The print job reception unit 406 receives a print job transmitted from the print PC 102, checks matching between information stored in the status information storage unit 405 and the print job, and commands the print execution unit 407 to perform print processing if there is no problem. For example, the print job reception unit 406 compares paper set in the print job and paper set in the paper feeding unit, and determines whether there is no mismatching in paper, and the like. If there is no mismatching in paper, the print processing is executed.

Subsequently, a functional block in the print PC 102 will be described. In the present exemplary embodiment, a print setting information display unit 403 illustrated in FIG. 4 is provided from a status information acquisition unit 401 by the print application, and a print job transmission unit 404 is provided by the printer driver. Initially, information regarding the print job transmitted by the print job transmission unit 404 is stored as the history information in the print history information DB 400. The status information acquisition unit 401 is capable of acquiring status information stored in the status information storage unit 405 of the image output apparatus 100, in addition to information about the printer driver installed in the print PC 102 and information about a spooler.

A print setting information comparison unit 402 compares the history information stored in the print history information DB 400 and the acquired status information, and determines a restorable level of the print setting information. The print setting information display unit 403 executes display control processing on the display screen 600 in accordance with a result of the determination. The print setting information display unit 403 requests the print job transmission unit 404 to create and transmit the print job.

FIG. 5 is a diagram illustrating an example of the print history information stored in the print history information DB 400. The print history information includes the history items 501 and history information 5021 to 5023. The print history information includes history information for print jobs transmitted by the print job transmission unit 404, for example, in time-series. The order of holding the history information may be an alphabetical order of names of print documents, an alphabetical order of names of image output apparatuses, or another freely-selected order. While only the last three pieces of history information are held in FIG. 5, as a matter of course, three or more pieces of history information may be held, and two or less pieces of history information may be held. The pieces of history information may be managed in different files on a parameter-type basis, or parameter types other than those described in FIG. 5 may be included in the print history information.

Figure 6:
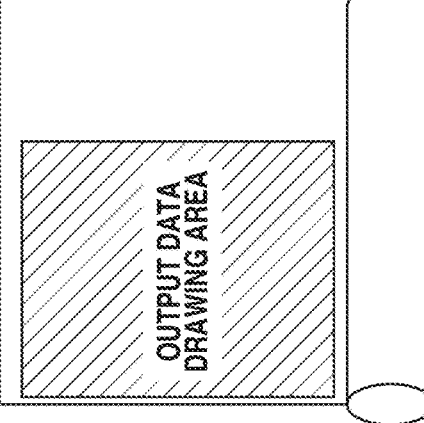
FIG. 6 is a diagram illustrating an example of a display screen for print setting information.

FIG. 6 is a diagram illustrating an example of the display screen 600 displayed on the display 309 of the print PC 102. The display screen 600 is provided by the print application. In the present exemplary embodiment, illustrated is an example of the display screen 600 in a case where the image output apparatus 100 is commanded to perform print. The display screen 600 includes the file list display section 601 that displays print document information listed on a document-by-document basis or a page-by-page basis. Furthermore, the display screen 600 includes the preview display section 602 which displays a preview image of a page selected in the file list display section 601, and the print setting display section 603 in which setting values for various types of print setting items are set. Of course, only the print setting display section 603 may be displayed, or there may be display sections other than the above-mentioned sections on the display screen 600. Pressing the print button 604 executes creation and transmission of a print job.

In a case where re-print is executed, target history information may be selected, for example, from a print history selection screen 700 illustrated in FIG. 7. The print history selection screen 700 in FIG. 7 is displayed in response to receiving, for example, selection of a tab for "job history" illustrated in FIG. 6.

The print history selection screen 700 receives from a user a target for re-print, from among the history information listed in a history information list 701. The history information list displayed as illustrated in FIG. 7 is displayed by the print application reading out the history information from the print history information DB 400. Subsequently, the print application determines whether to reflect history information selected by receiving the pressing of a re-submit button 702 in a print setting value in the print setting display section 603. Details of this determination processing will be described with reference to FIG. 9. Of course, the latest history information may be automatically selected in the history information list 701. For example, a button for printing the latest history information may be displayed in FIG. 6. In a case where the button is pressed, the latest history information may be automatically submitted to the print application. Only print history information corresponding to an image output apparatus available for communication may be displayed on the history information list 701, or only print history information regarding a specific account may be displayed on the history information list 701. That is, only history information about print jobs for which the user has commanded the print in the past is displayed, and history information for other users is not displayed. The history information that serves as a target for re-print may be determined by a method other than the above-described methods.

At the time of reflecting a print setting of the history information, in a case where there is a setting value in which history information, out of history information 502, cannot be reflected, a warning mark 802 may be displayed as warning information in a target item in the print setting display section 603 so that the user recognizes a warning at the time of performing restoration print. Unavailable history information may be notified as warning information by other methods, such as a display of a warning screen 801 and pop-up notification.

Figure 9:
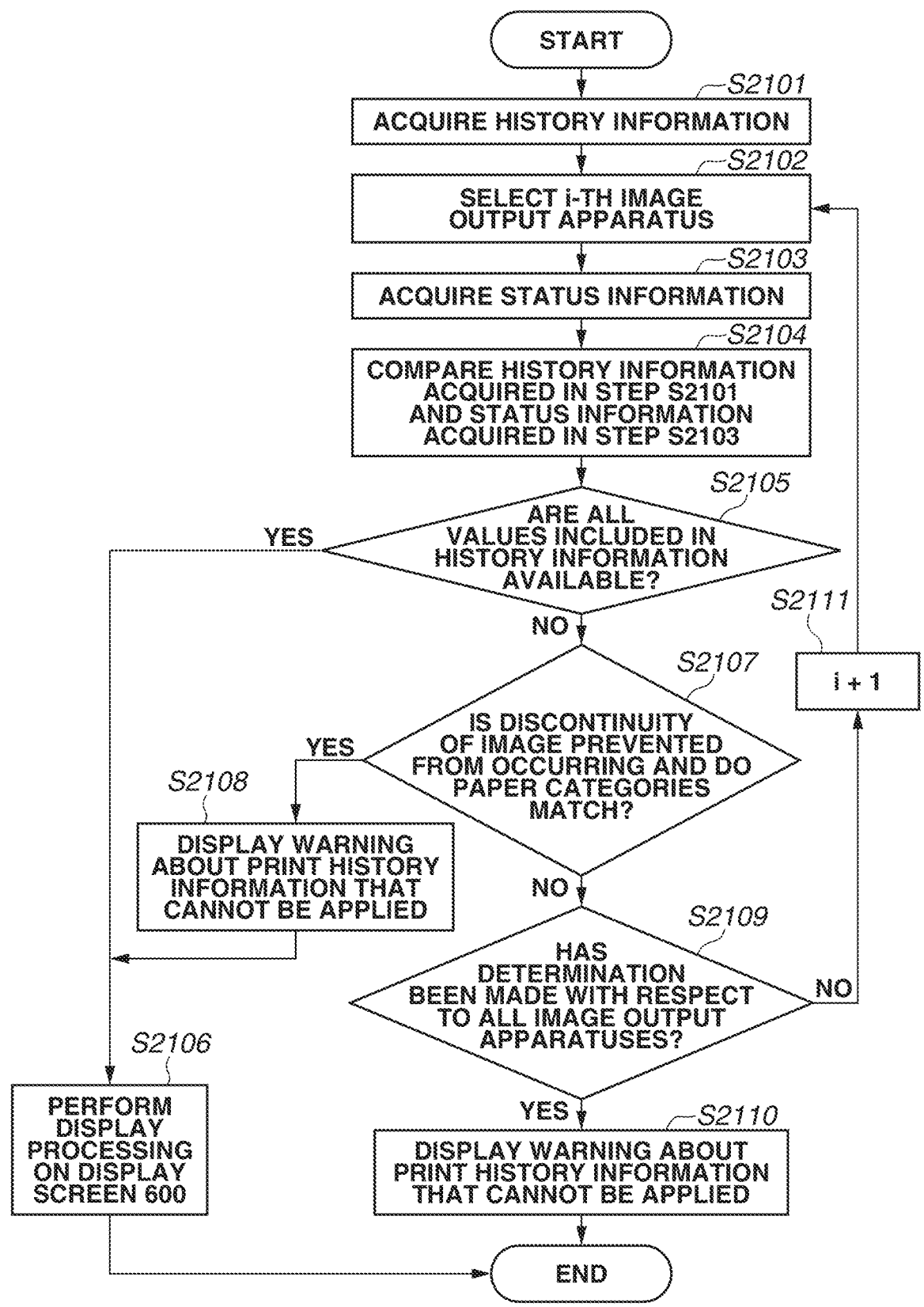
FIG. 9 is a flowchart for displaying a display screen for the print setting information.

FIG. 9 is an example of a flowchart regarding display control of the display screen 600 executed by the print PC 102 in response to receiving an instruction to perform re-print. The flowchart in the present exemplary embodiment is implemented by, for example, by the CPU 300 loading a program stored in the ROM 301 to the RAM 302 and executing the program.

The flowchart illustrated in FIG. 9 is started in response to the pressing of the re-submit button 702 on the print history selection screen 700 provided by the print application.

In step S2101, the print application acquires history information that is a target for re-submission from the print history information DB 400. In the present exemplary embodiment, a description will be provided assuming that history information A 5021 illustrated in FIG. 5 is acquired. Subsequently, the print application identifies the number of available image output apparatuses from the print PC 102, and initializes i to one. In step S2102, the print application selects an i-th image output apparatus.

In step S2103, the print application acquires status information from the image output apparatus selected in step S2102. In step S2104, the print application compares the history information acquired in step S2101 and the status information acquired in step S2103. For example, the print application determines whether the image output apparatus included in the status information acquired in step S2103 is a printer 1. If the image output apparatus included in the status information acquired in step S2103 is the printer 1, the print application determines whether 36 inch photo paper A is included in a roll 1 from the status information acquired in step S2103. The print application executes such comparison processing on remaining items. In step 2105, the print application determines whether all values included in the history information acquired in step S2101 match the status information for the image output apparatus selected in step S2102. In a case where all the values included in the history information acquired in step S2101 match the status information for the image output apparatus selected in step S2102 (YES in step S2105), the print application determines that all the values included in the history information are available. In contrast, in a case where at least one value included in the history information acquired in step S2101 does not match the status information for the image output apparatus selected in step S2102 (NO in step S2105), the print application determines that all the values included in the history information are not available.

In a case where as the result of the determination in step S2105 is YES, the processing proceeds to step S2106. In step S2016, the print application displays the display screen 600 based on the history information acquired in step S2101, and ends the processing in FIG. 9. Through the processing in step S2016, for example, values of the history information A are reflected in the print setting display section 603 illustrated in FIG. 6. A preview image based on the print document corresponding to the history information A and the print setting information that is reflected in the print setting display section 603 is displayed in the preview display section 602 illustrated in FIG. 6.

In a case where the result of the determination in step S2105 is NO, the processing proceeds to step S2107. In step S2107, the print application determines whether "discontinuity of an image is to be prevented from occurring" and "paper categories of output targets match (paper attributes are identical)" in a result of print using the history information A and the i-th image output apparatus. For example, the print application identifies the lengths in vertical and horizontal directions of the print document acquired using a path included in the history information. The print application then determines whether the discontinuity of the image is to be prevented from occurring using the identified lengths in the vertical and horizontal directions and a paper size of paper set in the image output apparatus selected in step S2102. In a case where it is determined that the discontinuity of the image is to be prevented from occurring, the print application determines whether a category of a paper type included in the history information matches a category of the paper type of the paper set in the image output apparatus selected in step S2102. Here, in a case where it is determined that the categories of the paper types match, the print application sets a result of the determination in step S2107 to YES. That is, a case where the determination in step S2107 is YES corresponds to a case where information regarding the image output apparatus does not correspond to part of setting values included in the history information, and a print result of print processing to be executed by the image output apparatus using the history information satisfies a predetermined condition. Here, the predetermined condition in the present exemplary embodiment corresponds to a case where "discontinuity of the image is to be prevented from occurring" and "the paper categories of output targets match". In contrast, in a case where it is determined that the discontinuity of the image is to occur or the categories of the paper types do not match, the print application sets a result of the determination in step S2107 to NO. That is, a case where the result of the determination in step S2107 is NO corresponds to a case where the information regarding the image output apparatus does not correspond to part of the setting values included in the history information and the print result of the print processing executed by the image output apparatus using the history information does not satisfy the predetermined condition. Note that "print result" herein refers to an expected print result that is expected to be obtained through print processing to be executed using the history information by the image output apparatus. Hereinafter, such a print result is referred to as simply "print result" or "expected print result".

In a case where the result of the determination in step S2107 is YES (YES in step S2107), the processing proceeds to step S2108. In step S2108, the print application displays a warning about a value that cannot be applied out of the history information acquired in step S2101. For example, the warning screen 801 as illustrated in FIG. 8A is displayed on the display screen 600. A value that cannot be set out of the acquired history information A is displayed on the warning screen 801. In a case where an OK button is pressed on the warning screen 801, the print application performs display control processing in step S2106. The processing in step S2106 displays, for example, a screen as illustrated in FIG. 8B. In FIG. 8B, a value of the history information A that can be set to the image output apparatus that has been selected at the time of performing the processing in step S2107 is displayed without change in the print setting display section 603. In contrast, a value of the history information A that cannot be set to the image output apparatus that has been selected at the time of performing the processing in step S2107 is replaced with a value of the selected image output apparatus. For example, FIG. 8B illustrates a display screen that is displayed in a case where it is determined that, with the use of the image output apparatus whose name is a "printer 2", values of the history information A from a "paper feeding port" to "borderless print" can be set. That is, the "printer 2" that corresponds to a value of the image output apparatus selected at the time of performing the processing in step S2107 is displayed as the name of the printer in the print setting display section 603, and corresponding values of the history information A are displayed in the remaining items.

In a case where the result of the determination in step S2107 is NO (NO in step S2107), the processing proceeds to step S2109. In step S2109, the print application determines whether a current value of i reaches the number of image output apparatuses that can be used by the print PC. In a case where the result of the determination in step S2109 is NO (NO in step S2109), the processing proceeds to step S2111. In step S2111, the print application adds 1 to the value of i, and executes the processing in step S2102 again. In contrast, in a case where the result of the determination in step S2109 is YES (YES in step S2109), the processing proceeds to step S2110. In step S2110, the print application displays a warning about an unavailable value out of the history information acquired in step S2101. In step S2110, a value that cannot be set out of the acquired history information A is displayed on the warning screen 801 as in the screen illustrated in FIG. 8A. In a case where an OK button is pressed on the warning screen 801 displayed in step S2110, the print application displays the display screen 600 in which the acquired history information is not reflected as illustrated in FIG. 6.

As described above, according to the present exemplary embodiment, a restorable level of the history information is determined in accordance with a value that cannot be set out of the history information, based on the history information selected in re-print and status information about an image output apparatus serving as a target for performing print. The present exemplary embodiment can present availability of the history information to the user depending on the value, thus increasing operability of the user.

Figure 10:
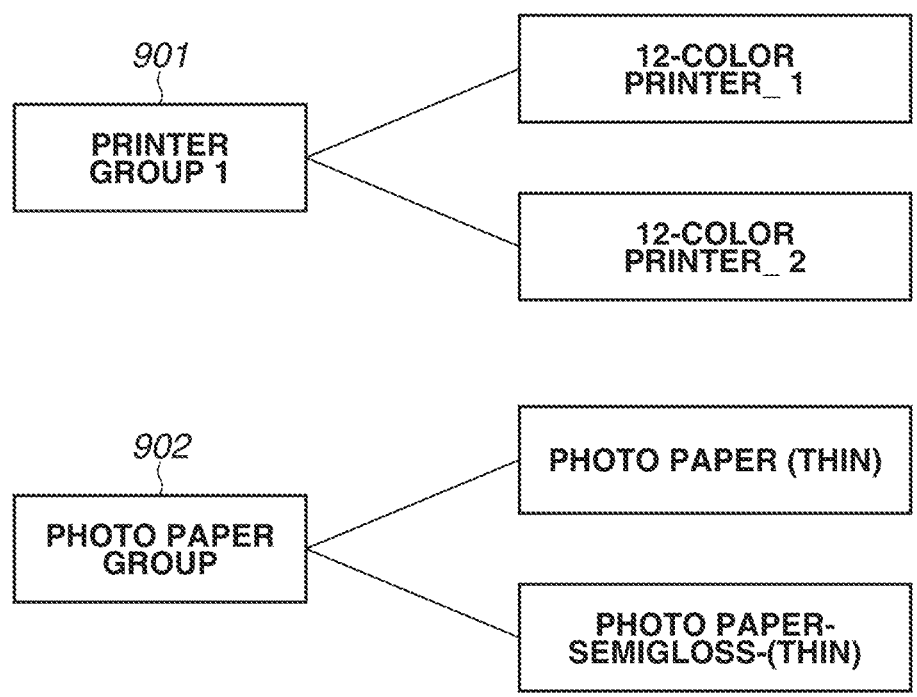
FIG. 10 is a diagram illustrating an example of grouping of history items.

A second exemplary embodiment of the present disclosure will be described below. In the above-mentioned first exemplary embodiment, the description has been provided of the image output apparatus having similar functions, and the configuration in which paper types are individually handled even if the paper types belong to similar categories. In a second exemplary embodiment, a description will be provided of a configuration in which these paper types are grouped and handled. In the present exemplary embodiment, points different from the above-mentioned exemplary embodiment will be described, and processing of the above-mentioned exemplary embodiment is executed with respect to the other points. For example, the print application groups and manages the image output apparatuses having similar functions and similar paper types, as illustrated in FIG. 10. In the determination made in step S2105 in FIG. 9, even if a value of the history information and a value of the selected image output apparatus are different from each other but if belong to an identical group, the print application may determine that the value of the history information to be available.

FIG. 10 illustrates an example of creating a group 901 regarding the image output apparatus 100 and a group 902 regarding a paper type, but as a matter of course, a group regarding the history items 501 other than those illustrated in FIG. 10 may be created.

The present exemplary embodiment increases a possibility of enabling re-print using the history information, thus increasing operability of the user.

A third exemplary embodiment of the present disclosure will be described below. In the above-mentioned exemplary embodiment, if a print document is submitted and the processing in FIG. 9 is executed while print setting information on the display screen 600 in FIG. 6 is being edited, there is a possibility that the print setting information being edited is reset. To address this, the print application may determine the presence or absence of an operation in process of editing before performing the processing in FIG. 9, and prevent the operation in process of editing from being reset.

Figure 11:
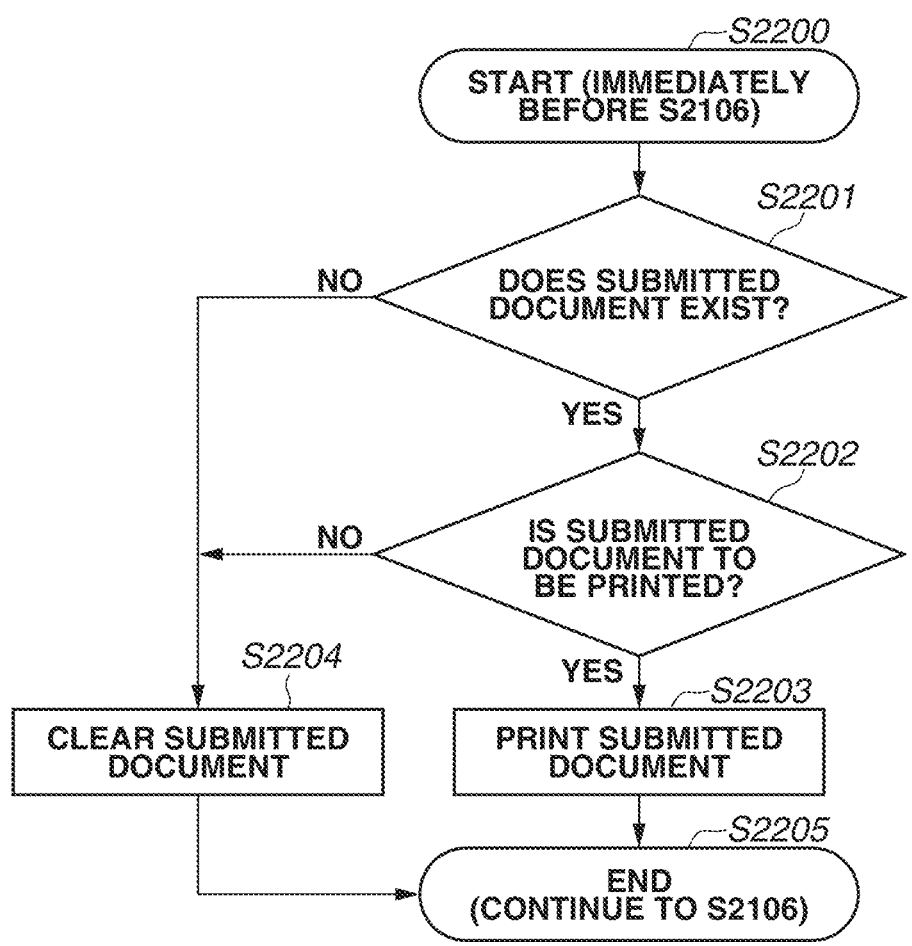
FIG. 11 is a flowchart for processing based on a submitted document.

In step S2200, processing in FIG. 11 is started, for example, immediately before the processing in step S2106. In step S2201, the print application initially determines whether there is a submitted document. If there is the submitted document (YES in step S2201), the processing proceeds to step S2202. In step S2202, the print application makes inquiry about whether to print the submitted document to the user. In a case where print is commanded by the user (YES in step S2202), the processing proceeds to step S2203. In step S2203, the print application commands print using print setting information being edited and the print document. In a case where there is no submitted document (NO in step S2201) or print is not commanded in step S2202 (NO in step S2202), the processing proceeds to step S2204. In step S2204, the print application clears the submitted document and the print setting information being edited. The print application then continues the processing in step S2106 after executing the processing in FIG. 11.

The print application clears the submitted document and the print setting information being edited in FIG. 11, but may be configured to clear either one of the submitted document and the print setting information being edited. The print application commands print in step S2203, but may store the submitted print document and the print setting information being edited, for example. In a case where the result of the determination in step S2201 is YES, the print application may display a warning message indicating that the operation in process of editing is canceled, and end the processing if an OK button is pressed. The print application may commands the print, for example, after completing the processing in FIG. 9, instead of commanding the print at timing of step S2203.

Other Exemplary Embodiments

While the print application executes the processing in step S2106 at time when the image output apparatus for which the result of the determination in step S2107 is YES is detected and ends the processing in the above-mentioned exemplary embodiments, other configurations may be employed. For example, the print application stores information about the image output apparatus for which the result of the determination in step S2107 is YES, and makes determination in step S2109. If NO in the determination in step S2109, the print application executes the operations in step S2111 and step S2102, and executes the operations in step S2103 and subsequent steps with respect to the next image output apparatus. In a case where the result of the determination in step S2109 is YES, the print application may alternatively select an image output apparatus with which the largest number of values of the history information A can be set, out of image output apparatuses for which the result of the determination in step S2107 is YES.

While the description has been provided of the example in which the screens in FIGS. 8A and 8B are displayed through the operations in step S2108 and step S2106, respectively, other screens may be displayed. For example, the history information may be reflected in a print setting section and a warning mark 802 may be displayed, as illustrated in FIG. 8C.

The print application determines whether "discontinuity of an image is to be prevented from occurring" and "the paper categories of output targets match" in step S2107 described above, but this is not restrictive. For example, the print application may determine only whether "discontinuity of an image is to be prevented from occurring" in step S2107. Alternatively, the print application may determine only whether "the paper categories of output targets match" in step S2107, for example. Examples of other conditions for the determination include a paper size, font information about a print document, and the like.

In the above-mentioned exemplary embodiments, the description has been provided assuming that the print application executes the processing in each of the exemplary embodiments, but other software may execute the processing of each of the above-mentioned exemplary embodiments. For example, the printer driver may execute the processing in the above-mentioned exemplary embodiments.

In the above-mentioned exemplary embodiments, the description has been provided of the example of the case in which re-print is executed using the history information, but the processing in the above-mentioned exemplary embodiments may be executed in another case. For example, a print document may be printed using a new print document, while using the history information only for print setting information or the like.

The processing in the above-mentioned exemplary embodiments may be implemented by installing a program that implements one or more functions of each of the above-mentioned exemplary embodiments in a system or an apparatus through a network or a storage medium, and one or more processors in the system or a computer of the apparatus reading out and executing the program. The processing in the above-mentioned exemplary embodiments can be implemented by a circuit (for example, an application-specific integrated circuit (ASIC)) that implements one or more functions. The exemplary embodiments can increase convenience of the user in performing print using the history information.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-181048, filed Oct. 29, 2020, which is hereby incorporated by reference herein in its entirety.

What is claimed is:

1. An information processing apparatus capable of communicating with an image output apparatus, the information processing apparatus comprising:
   a storage unit; and
   at least one processor causing the information processing apparatus to act as:
      a storage control unit configured to store print setting information corresponding to a print job for which print is commanded, as history information in the storage unit;
      a determination unit configured to determine, in a case where print using the history information is commanded, and information regarding an image output apparatus that is available for use by the information processing apparatus does not correspond to part of setting values included in the history information, whether a print result of print processing to be executed by the image output apparatus using the history information satisfies a predetermined condition; and
      a display control unit configured to display, in a case where the determination unit determines that the print result satisfies the predetermined condition, a first print setting screen in which the information regarding the image output apparatus is reflected in an item corresponding to the part of the setting values and setting values of the history information are reflected in other items, and display, in a case where the determination unit determines that the print result does not satisfy the predetermined condition, a second print setting screen in which the setting values included in the history information are not reflected.

2. The information processing apparatus according to claim 1,
   wherein the history information includes information regarding a print document for which the print is commanded and print setting information, and
   wherein the predetermined condition is that a part of the print document is not lost in the print result of the print processing to be executed by the image output apparatus using the history information.

3. The information processing apparatus according to claim 1,
   wherein the predetermined condition is that a paper type to be used in the print result of the print processing to be executed by the image output apparatus using the history information and a paper type of the print setting information included in the history information belong to an identical attribute.

4. The information processing apparatus according to claim 1,
   wherein the display control unit is configured to display, in a case where the print result satisfies the predetermined condition, warning information indicating that the part of the setting values of the history information is not settable.

5. The information processing apparatus according to claim 1,
wherein the determination unit is configured to determine, in a case where the print using the history information is commanded, a presence or absence of an operation in process of editing, wherein, in a case where the determination unit determines that the operation in process of editing is present, the display control unit is configured to make inquiry about whether to execute print processing based on the operation in process of editing.

6. A control method executed in an information processing apparatus capable of communicating with an image output apparatus, the control method comprising:
storing print setting information corresponding to a print job for which print is commanded, as history information in a storage unit of the information processing apparatus;
determining, in a case where print using the history information is commanded, and information regarding an image output apparatus that is available for use by the information processing apparatus does not correspond to part of setting values included in the history information, whether a print result of print processing to be executed by the image output apparatus using the history information satisfies a predetermined condition; and
displaying, in a case where it is determined that the print result satisfies the predetermined condition, a first print setting screen in which the information regarding the image output apparatus is reflected in an item corresponding to the part of the setting values and setting values of the history information are reflected in other items, and displaying, in a case where it is determined that the print result does not satisfy the predetermined condition, a second print setting screen in which the setting values included in the history information are not reflected.

7. The control method according to claim 6,
wherein the history information includes information regarding a print document for which the print is commanded and print setting information, and
wherein the predetermined condition is that a part of the print document is not lost in the print result of the print processing to be executed by the image output apparatus using the history information.

8. The control method according to claim 6,
wherein the predetermined condition is that a paper type to be used in the print result of the print processing to be executed by the image output apparatus using the history information and a paper type of the print setting information included in the history information belong to an identical attribute.

9. The control method according to claim 6,
wherein, in a case where the print result satisfies the predetermined condition, warning information indicating that the part of the setting values of the history information is not settable is displayed.

10. The control method according to claim 6, further comprising determining, in a case where the print using the history information is commanded, a presence or absence of an operation in process of editing, wherein, in a case where it is determined that the operation in process of editing is present, inquiry about whether to execute print processing based on the operation in process of editing is made.

11. A non-transitory computer-readable storage medium storing one or more programs including instructions, which when executed by one or more processors of an information processing apparatus capable of communicating with an image output apparatus, cause the information processing apparatus to:
store print setting information corresponding to a print job for which print is commanded, as history information in a storage unit of the information processing apparatus;
determine, in a case where print using the history information is commanded, and information regarding an image output apparatus that is available for use by the information processing apparatus does not correspond to part of setting values included in the history information, whether a print result of print processing to be executed by the image output apparatus using the history information satisfies a predetermined condition; and
display, in a case where it is determined that the print result satisfies the predetermined condition, a first print setting screen in which the information regarding the image output apparatus is reflected in an item corresponding to the part of the setting values and setting values of the history information are reflected in other items, and display, in a case where it is determined that the print result does not satisfy the predetermined condition, a second print setting screen in which the setting values included in the history information are not reflected.

12. The non-transitory computer-readable storage medium according to claim 11,
wherein the history information includes information regarding a print document for which the print is commanded and print setting information, and
wherein the predetermined condition is that a part of the print document is not lost in the print result of the print processing to be executed by the image output apparatus using the history information.

13. The non-transitory computer-readable storage medium according to claim 11,
wherein the predetermined condition is that a paper type to be used in the print result of the print processing to be executed by the image output apparatus using the history information and a paper type of the print setting information included in the history information belong to an identical attribute.

14. The non-transitory computer-readable storage medium according to claim 11,
wherein, in a case where the print result satisfies the predetermined condition, warning information indicating that the part of the setting values of the history information is not settable is displayed.

15. The non-transitory computer-readable storage medium according to claim 11, wherein the instructions, when executed by the one or more processors, further cause the information processing apparatus to:
determine, in a case where the print using the history information is commanded, a presence or absence of an operation in process of editing, wherein, in a case where it is determined that the operation in process of editing is present, inquiry about whether to execute print processing based on the operation in process of editing is made.

* * * * *